United States Patent [19]

Hansen et al.

[11] 4,263,049

[45] Apr. 21, 1981

[54] FIBRE-REINFORCED PRODUCT AND METHOD OF PREPARING SAME

[75] Inventors: Karl E. Hansen, Kokkedal; Peder Pedersen, Roskilde, both of Denmark

[73] Assignee: Rockwool International A/S, Hedehusene, Denmark

[21] Appl. No.: 82,547

[22] Filed: Oct. 9, 1979

[30] Foreign Application Priority Data

Oct. 10, 1978 [DK] Denmark .............................. 4507/78

[51] Int. Cl.³ .................................................. C04B 31/36
[52] U.S. Cl. .......................................... 106/93; 106/99
[58] Field of Search ............................ 106/93, 99, 108

[56] References Cited

U.S. PATENT DOCUMENTS

| | | | |
|---|---|---|---|
| 827,977 | 8/1906 | Johnson | 106/93 |
| 844,530 | 2/1907 | von Mollenbruck | 106/93 |
| 3,062,669 | 11/1962 | Dilnot | 106/99 X |
| 3,438,853 | 4/1969 | Haines et al. | 106/93 |
| 3,969,567 | 7/1976 | Occleshaw | 106/99 X |

*Primary Examiner*—G. O. Peters
*Attorney, Agent, or Firm*—Watson, Cole, Grindle & Watson

[57] ABSTRACT

A fibre-reinforced cementitious product comprising a fibre reinforcement, at least partly consisting of eucalyptus fibres.

15 Claims, No Drawings

FIBRE-REINFORCED PRODUCT AND METHOD OF PREPARING SAME

BACKGROUND OF THE INVENTION

This invention relates to a cementitious product reinforced by cellulosic fibres and optionally synthetic fibres.

It is well known to use asbestos fibres for the reinforcement of cementitious products. Thus, asbestos fibres find widespread use in the manufacture of asbestos cement roofing plates, such as plates sold under the trade name "Eternit".

Products made from asbestos cement present many advantageous properties, such as a high bending strength, excellent resistance against attack by chemicals and good ageing properties.

However, asbestos cement products suffer from the serious drawback that the manufacture and handling of such products present such serious health problems that is may be expected that the use of asbestos fibres as reinforcement in cementitious products will be prohibited in a few years.

It is well known to utilize a mixture of asbestos fibres and cellulosic fibres as reinforcement in the production of asbestos cement products.

However, attempts to fully replace asbestos fibres by cellulosic fibres in fibre-reinforced cementitious products and in amounts of from 0.5 to 20% by weight have failed to produce products having satisfactory strength properties. Thus, the maximum obtainable binding strength (after storage for 4 weeks) for fibre-reinforced cement products comprising pine-wood cellulosic fibres is only about 165 kp/cm². Such bending strength is obtained by using reinforcing fibres in an amount of 4% by weight and this strength does not increase significantly when the amount of fibres is increased.

The strength mentioned above is unsatisfactory because a bending strength of at least 165 kp/cm² is considered to be a minimum one in order to permit the replacement of asbestos cement products by products reinforced by cellulosic fibres.

SUMMARY OF THE INVENTION

Surprisingly it has been found that a specific type of cellulosic fibres are capable of producing a high reinforcing effect when used as reinforcing fibres in cementitious products and that the bending strength of such fibre-reinforced cementitious products is considerably higher than the above mentioned minimum value.

Thus, in the fibre-reinforced cementitious product of the invention the reinforcing fibres are at least partly composed of eucalyptus fibres.

The term "eucalyptus fibres" should be understood as discrete fibres obtained by defibration of eucalyptus wood.

By using eucalyptus fibres in fibre-reinforced cementitious products a bending strength of above 220 kp/cm² (after storage for 4 weeks) has been obtained. Thus, the strength is increased by more than 30% compared to products reinforced by pine-wood fibres.

Examples of different types of eucalyptus fibres which are suitable for use in the cementitious product of the invention are fibres of *Eucalyptus saligna, Eucalyptus globulus* and *Eucalyptus camaldulensis*.

It is preferred to use fibres which have been prepared by a sulphate process and which have been bleached.

The reinforcing effect of both eucalyptus fibres and pine-wood fibres on cementitious products has been investigated by tests. These tests were carried out in the following manner:

Cellulosic fibres were dispersed in 1 liter water and 5 liters additional water and optionally rock wool fibres were added. Subsequently, the mixture thus obtained was stirred for 5 minutes before Portland cement was added.

After stirring for 5 minutes, a polyelectrolyte ("Reten 123 x") was added in an amount of 4.2 ppm. Stirring was continued for one additional minute and the mixture was then transferred to a sheet mould comprising a net covered by a sheet of filter paper. The mixture was then dewatered by suction and the layer thus formed on the sheet of filter paper was compressed at increasing pressures (1 minute at 5 kp/cm², 1 minute at 10 kp/cm² and 1 minute at 15 kp/cm²).

Subsequently, 5 layers of filter paper were placed on each side of the fibre cement plate formed and the plate was compressed for 2 minutes at a pressure of 60 kp/cm².

The plates thus prepared were stored at room temperature and a relative humidity of 100% and the bending strength and density were measured.

The composition of the tested fibre cement samples and their properties are reported in Table 1.

TABLE 1

| Reinforcing Fibres | | Number of Measurements | Measured Bending Strength kp/cm² | | | Density, g/cm³ | Corrected Bending Strength after Storage for 4 Weeks and at a Density of 1.7 g/cm³ |
| --- | --- | --- | --- | --- | --- | --- | --- |
| Type | Amount, % | | After Storage for 1 Week | After Storage for 2 Weeks | After Storage for 4 Weeks | | |
| Eucalyptus-fibres | 1 | 8 | 111 ± 13 | 157 ± 12 | 138 ± 15 | 1.88 ± 0.03 | 113 ± 14 |
| Eucalyptus-fibres | 2 | 8 | 118 ± 9 | 143 ± 16 | 155 ± 20 | 1.88 ± 0.03 | 128 ± 15 |
| Eucalyptus-fibres | 3 | 8 | 153 ± 8 | 153 ± 4 | 172 ± 11 | 1.81 ± 0.01 | 150 ± 9 |
| Eucalyptus-fibres | 4 | 8 | 177 ± 5 | 199 ± 12 | 208 ± 14 | 1.78 ± 0.02 | 191 ± 14 |
| Eucalyptus-fibres | 5 | 8 | 193 ± 10 | 198 ± 10 | 226 ± 8 | 1.73 ± 0.03 | 219 ± 12 |
| Eucalyptus-fibres | 10 | 2 | 147 ± 7 | — | — | 1.58 ± 0.02 | 169 ± 6* |
| Eucalyptus-fibres | 20 | 10 | 125 ± 10 | 148 ± 10 | 183 ± 12 | 1.35 ± 0.02 | 290 ± 12 |
| Eucalyptus-fibres | 30 | 10 | 91 ± 11 | 101 ± 9 | 117 ± 10 | 1.08 ± 0.03 | 291 ± 12 |

TABLE 1-continued

| Reinforcing Fibres | | Number of Measurements | Measured Bending Strength kp/cm² | | | Density, g/cm³ | Corrected Bending Strength after Storage for 4 Weeks and at a Density of 1.7 g/cm³ |
|---|---|---|---|---|---|---|---|
| Type | Amount, % | | After Storage for 1 Week | After Storage for 2 Weeks | After Storage for 4 Weeks | | |
| None | 0 | 10 | 86 ± 46 | — | 134 ± 32 | 1.78 ± 0.11 | 122 ± 22 |
| Pine-Wood Fibres | 1 | 8 | 123 ± 17 | 146 ± 30 | 124 ± 27 | 1.73 ± 0.11 | 124 ± 39 |
| Pine-Wood Fibres | 2 | 8 | 130 ± 6 | 149 ± 3 | 141 ± 10 | 1.72 ± 0.10 | 139 ± 23 |
| Pine-Wood Fibres | 3 | 8 | 180 ± 17 | 176 ± 3 | 170 ± 11 | 1.77 ± 0.02 | 156 ± 11 |
| Pine-Wood Fibres | 4 | 8 | 177 ± 16 | 163 ± 5 | 169 ± 13 | 1.72 ± 0.08 | 162 ± 17 |
| Pine-Wood Fibres | 5 | 8 | 148 ± 18 | 175 ± 21 | 171 ± 27 | 1.72 ± 0.02 | 165 ± 23 |

*After storage for 1 week.

The data set forth in Table 1 show that the reinforcing effect of eucalyptus fibres increases with increasing fibre contents up to about 5% and that no significant improvement of the strength is obtained at higher fibre contents. Therefore, the cementitious products of the invention preferably contain eucalyptus fibres in an amount of 3–10% by weight based on the weight of the cementitious product.

In a preferred embodiment of the fibre-reinforced cementitious product of the invention the fibrous reinforcement comprises both eucalyptus fibres and synthetic mineral fibres, e.g. rock wool fibres. A cementitious product comprising such a combination of fibres as fibrous reinforcement presents excellent properties for practical use.

Thus, the toughness of the product is high and, therefore, it can be handled without break. Thus, such a composition is particularly useful for the manufacture of roofing plates which should be capable of withstanding blows and impacts without breakage.

This is evidenced by the work required to cause breakage which work can be determined by integrating the area below a deflection curve obtained by measuring the deflection of a specimen supported at its ends at varying loads, the abscissa defining the deflection and the ordinate the load.

By testing different materials it has been found that the work required to cause breakage is 5.5 for a cementitious product containing 5% by weight of eucalyptus fibres and 7.7 for a product containing 5% by weight of eucalyptus fibres and 5% by weight of rock wool fibres. These figures are based on the definition that the work required to cause breakage of a product consisting of cement is 1.

By using the above mentioned combination of fibres as a reinforcement in cementitious products, a product is obtained which is resistant to the formation of shrinkage cracks which may occur when the reinforcing fibres are eucalyptus fibres only. Consequently, the weathering resistance of the product and in particular the frost resistance is increased by using said combination of fibres.

When using both eucalyptus and synthetic mineral fibres as reinforcement, the latter is preferably present in an amount of 5–10% by weight based on the total weight of the reinforced product.

The term "mineral fibres" comprises fibres prepared from naturally occurring minerals. Examples of synthetic mineral fibres are rock wool fibres, glass fibres and slag fibres.

The invention also relates to a method of preparing a fibre-reinforced cementitious product as described above.

The method of the invention comprises the steps of disperging eucalyptus fibres preferably in an amount of 3–10% by weight based on the weight of the final product and optionally mineral fibres in water by stirring, adding while continuously stirring the dispersion, a cement and optionally a polyelectrolyte and moulding and storing the mixture thus formed so as to form the desired product.

We claim:

1. An asbestos-free, fiber-reinforced cementitious product comprising a major portion of a cementitious material and a reinforcing quantity of a fibrous material including a sufficient amount of eucalyptus fibers to provide a final product having improved bending strength characteristics.

2. A cementitious product as set forth in claim 1 wherein said eucalyptus fibers are present in an amount of from 3% to 10% by weight based on the total weight of the product.

3. A cementitious product as set forth in claim 1 wherein a sufficient quantity of said eucalyptus fibers are present to provide a bending strength of at least 165 kp/cm² after storage for four weeks.

4. A cementitious product as set forth in claim 1 wherein said fibrous material also includes synthetic fibers.

5. A cementitious product as set forth in claim 4 wherein said synthetic fibers are present in an amount of from 5% to 10% by weight based on the total weight of the product.

6. A cementitious product as set forth in claim 2 wherein said fibrous material also includes synthetic fibers.

7. A cementitious product as set forth in claim 6 wherein said synthetic fibers are present in an amount of from 5% to 10% by weight based on the total weight of the product.

8. A method of preparing an asbestos-free, fiber-reinforced cementitious product comprising:
dispersing in water a reinforcing quantity of a fibrous material including a sufficient amount of eucalyptus fibers to provide a final product having improved bending strength characteristics;

stirring said dispersion while adding cementitious material thereto;
molding the mixture thus formed; and
storing the molded product.

9. A method as set forth in claim 8 wherein a polyelectrolyte is added along with the cementitious material during said stirring step.

10. A method as set forth in claim 8 wherein said fibrous material also includes synthetic fibers.

11. A method as set forth in claim 8 wherein said eucalyptus fibers are present in an mount of from 3% to 10% by weight based on the total weight of the product.

12. A method as set forth in claim 8 wherein a sufficient quantity of said eucalyptus fibers are present to provide a bending strength of at least 165 kp/cm$^2$ after storage for four weeks.

13. A method as set forth in claim 10 wherein said synthetic fibers are present in an amount of from 5% to 10% by weight based on the total weight of the product.

14. A method as set forth in claim 11 wherein said fibrous material also includes synthetic fibers.

15. A method as set forth in claim 14 wherein said synthetic fibers are present in an amount of from 5% to 10% by weight based on the total weight of the product.

* * * * *